United States Patent [19]

Obara

[11] Patent Number: 6,115,787
[45] Date of Patent: Sep. 5, 2000

[54] DISC STORAGE SYSTEM HAVING CACHE MEMORY WHICH STORES COMPRESSED DATA

[75] Inventor: Kiyohiro Obara, Odawara, Japan

[73] Assignee: Hitachi, Ltd., Tokyo, Japan

[21] Appl. No.: 08/964,458

[22] Filed: Nov. 4, 1997

[30] Foreign Application Priority Data

Nov. 5, 1996 [JP] Japan .................................. 8-292393

[51] Int. Cl.$^7$ .................................................. G06F 12/08
[52] U.S. Cl. ............................................. 711/113; 710/68
[58] Field of Search ........................... 710/68; 711/111, 711/112, 113, 114; 714/6, 7

[56] References Cited

U.S. PATENT DOCUMENTS

| | | | |
|---|---|---|---|
| 5,206,939 | 4/1993 | Yanai et al. | 711/4 |
| 5,247,638 | 9/1993 | O'Brien et al. | 710/68 |
| 5,465,338 | 11/1995 | Clay | 711/112 |
| 5,493,574 | 2/1996 | McKinley | 714/773 |
| 5,568,650 | 10/1996 | Mori | 710/52 |
| 5,652,857 | 7/1997 | Shimoi et al. | 711/113 |
| 5,652,878 | 7/1997 | Craft | 707/1 |
| 5,761,536 | 6/1998 | Franaszek | 710/68 |
| 5,875,454 | 2/1999 | Craft et al. | 711/113 |
| 5,933,853 | 8/1999 | Takagi | 711/113 |

*Primary Examiner*—Eddie P. Chan
*Assistant Examiner*—Yamir Encarnación
*Attorney, Agent, or Firm*—Antonelli, Terry, Stout & Kraus, LLP

[57] ABSTRACT

In order to store plural compressed records into a cache memory of a disk storage system in an easy-to-read manner, data to be stored in the cache memory is divided into plural data blocks each having two cache blocks in association with track blocks to which the data belongs and are compressed. The respective data blocks after the compression are stored in one or plural cache blocks. Information for retrieving each cache block from an in-track address for the data block is stored as part of retrieval information for the cache memory. When the respective data blocks in a record is read, the cache block storing the compressed data block is determined based on the in-track address of the data block and the retrieval information.

13 Claims, 6 Drawing Sheets

DISC STORAGE SYSTEM HAVING CACHE MEMORY WHICH STORES COMPRESSED DATA

BACKGROUND OF THE INVENTION

The present invention relates to a method of compressing data and storing the same in a memory, and a disk storage system having a cache memory to which the method is applied.

In recent years, a disk storage system having at least one disk storage device is commonly provided with a cache memory. In particular, most of disk array systems which use plural disk drives to thereby impart redundancy and to thereby increase in performance and resistance to failure have capacities of a few hundred gigabytes. So, they have cache memories of a capacity of several gigabytes.

In the disk storage system, the difference between the time required to access a recording medium and the time required to access the cache memory is very large. Therefore, the effect of improving a response time due to introduction of the cache memory is noticeably exhibited in the disk storage system. With increase in the capacity of the cache memory, the hit rate of the cache memory is improved and the response time is improved. On the other hand, the provision of the disk storage system with a cache memory of large capacity greatly increases the overall cost of the disk storage system.

Meanwhile, data compression technique is known as means that effectively uses less storage regions. According to a reference, for example, "Document Data Compression Algorithm" by Tomohiko Uematsu, CQ publishing Co., Ltd., pp. 227–244, data can be compressed to a capacity less than half the original data on the whole although the capacity depends on a compression algorithm or data to be compressed.

SUMMARY OF THE INVENTION

The present inventors investigated application of the aforementioned compression technique to a cache memory of a disk storage system, to find out the following.

In the disk storage system, data greater than twice non-compressed data can be stored in the cache memory, when input data is compressed and stored in the cache memory. This is effectively equivalent to the case in which the capacity of the cache memory is increased to greater than twice its capacity. Even in terms of the cost, the effect of the cache memory similar to the prior art can be obtained by the capacity equal to one-half the conventional capacity and the amount of an expensive memory used can be reduced.

However, application of the compression technique to the cache memory has the problem of how to store the compressed data in the cache memory and retrieve the stored compressed data.

In the conventional disk storage system, plural data (records) supplied from a host are stored in each track. Each record includes control data and write data. The control data includes a record number and record length. When an initial record L1 is stored in a given track and thereafter the next record is stored therein, the record L1 is read and the position to write the head of the next record L2 is determined from the record length included in the control code of the record L1. Even when the subsequent records L3, L4 and the like are written, the same processing is repeated to the preceding records L1, L2, L3 and the like. This is also used when a record is read after plural records have been stored, to determine the leading position of the record.

Even when plural records are held in a cache memory in the disk storage system without compressing them, it is expected that data belonging to a target record can be read by a similar method.

However, the above mentioned method of determining the storage position of a record cannot be used when each record is compressed and stored in the cache memory. For example, determination of the position to write the leading data of the record L2 after the record L1 is compressed and stored in the cache memory can be achieved by modifying the above method a little. Namely, the compressed record L1 is read from the cache memory and decompressed. The position to write the leading data of the record L2 can be determined based on the control data of the decompressed record L1. However, when the record L2 is thereafter compressed and stored in the cache memory and thereafter the record L3 is to be stored therein, the position to store the leading data of the record L3 cannot be determined by the aforementioned method alone. Namely, when the control data in the record L1 is to be read after the compressed records L1 and L2 have been stored, data to be read as the record L1 cannot be determined unless the length of the compressed record L1 is found. This is the same regarding the record L2. Thus, when the respective compressed records are to be stored in the cache memory, it is necessary to store the length of each compressed record, or alternate information is necessary.

However, it has been found that the method of storing the lengths of the compressed records in a cache directory or the like has a problem also. Actually, there are cases in which write data supplied form the host includes plural records. If such write data is compressed, the lengths of the individual records included in the write data and compressed cannot be found.

In order to detect the lengths of the individual records included in such write data and compressed, the following processing, for example, is required. Before compression of the write data, control data for the individual records included in the write data are cut out, and record lengths included in the respective control data are cut out. The write data is separated into plural data according to the lengths of the individual records, and the respective data are compressed separately.

However, such a method needs to judge the contents of the write data supplied from the host. In fact, the write data cannot be successively written into the cache memory, due to the time required to judge the contents of the write data supplied from the host. It is desirable from a practical viewpoint that the write data successively supplied from the host can be successively written into the cache memory. Thus, the method invented above is not practical in case it is applied to the cache memory of the disk storage system.

Thus, when plural records to be written into the same track are written into the cache memory in accordance with the method of compressing the write data which may include the plural records and storing it into the cache memory, it is necessary to read the overall data already written into the cache memory and to be written into the same track from the cache memory and decompress the data upon writing the subsequent records into the cache memory. However, time is spent in decompressing such a large quantity of data. This is the same even with the case where one of plural records to be stored in the same track is read out after they are stored in the cache memory.

Thus, when data to be written into a given track is compressed and the compressed data is stored in the cache memory, it is necessary to decompress the whole of the already-stored data which is to belong to the same track. So, a first problem arises that time is spent in the decompression process.

Further, when the record is thereafter updated, the length of the compressed record after the updating is different from that of the compressed record before the updating. This is because the length of a compressed record differs according to the contents of the record. Thus, a second problem arises in that there may be cases where a compressed record after the updating cannot be stored in a storage region of the compressed record before the updating. In this case, it is necessary to change the region in which the updated compressed data after the updating is stored or move other compressed data stored in storage regions before or after the storage region of the compressed data after the updating. When the region in which the compressed data after the updating is stored is changed, the storage region of the compressed data before the updating is brought to a vacant state. When the other compressed data is moved, an additional process for moving the data is required.

Thus, an object of the present invention is to provide a disk storage system which can store compressed records in a cache memory and read a desired one of compressed records that belong to the same track, from the cache memory by a simple process.

Another object of the present invention is to provide a disk storage system having a cache memory which can simply cope with a change in the capacity of an arbitrary compressed record, which takes place when the arbitrary compressed record stored in the cache memory is updated.

In order to achieve the above objects, a control circuit for a cache memory, within a disk storage system according to the present invention, divides write data to be stored in the disk drive as supplied from an upper level equipment, into a plurality of data blocks, based upon a logical disk address as specified by said upper level equipment and compresses the same, and stores said compressed plurality of data blocks into a group of cache blocks within said cache memory, in such a manner that each cache block stores data belonging to one data block and does not store data belonging to different data blocks.

A logical track specified by said logical disk address as specified by said upper level equipment is divided into a plurality of track blocks having mutually same capacities; and said plurality of data blocks are defined such that each of said plurality of data blocks comprises only data having a logical disk address belonging to a same one of said plurality of track blocks.

When one of said plurality of divided data blocks is to be read from said cache memory, said control circuit determines at least one cache block within said group of cache blocks, which stores one compressed data block corresponding to said one data block to be read, reads data stored in said at least one cache block, and decompresses the said data.

Each of said group of cache blocks has a first capacity, and the capacity of each of said plurality of track blocks is predetermined so as to have a second capacity larger than the first capacity.

Described more specifically, when said plurality of compressed data blocks are stored in said group of cache blocks within said cache memory, said control circuit stores information for retrieving each of said group of cache blocks, based on a logical disk address of at least partial data belonging to compressed data block stored in said each of said group of cache blocks, as part of retrieval information for said cache memory, and performs determination of said at least one cache block storing said one compressed data block corresponding to said one data block to be read, based on said stored retrieval information and said logical disk address of said at least one data block to be read.

According to the control circuit, a data block containing part of data in a record, which is included in write data, is stored in one or plural cache blocks. When the part of data is read, the plural cache blocks can be determined according to a logical disk address of one track block corresponding to the data block and hence the data block can be easily read from the cache memory.

For example, a process for storing the first record L1 in a given track can be executed in the following manner by using a logical disk address. The record L1 starts from the leading value of an address on the track, which is specified by the logical disk address, and has addresses ranging to an address on the track with respect to a record tail determined according to the length of the record. According to the address range, the record L1 is divided into plural data blocks and the individual data blocks are compressed and stored in one or plural cache blocks. Thus, each data block including control data, which is located at the head of the record, has the leading value of the address on the track. Accordingly, the cache block storing therein the compressed data block including the control data of the record L1 can be easily determined.

When a record L2 is stored in the cache memory, the compressed data block including the control data is read and decompressed. The control data is cut out from the decompressed data block and an address on a track for the leading data of the record L2 can be determined from data length included therein. Thus, a range in which addresses on the track possessed by data belonging to the record L2 are distributed, is determined. Based on the determined address range, the record L2 is divided into plural data blocks and the individual data blocks are compressed and stored in one or plural cache blocks. The subsequent reading of the record L2 or the high-speed storing or reading of a record L3 can be done in the same manner as described above. Thus, one compressed data block including the control data in the given record may be read and decompressed to read the control data in the given record from the cache memory.

DETAILED DESCRIPTION OF THE PREFERRED EMBODIMENTS

Figure 1:
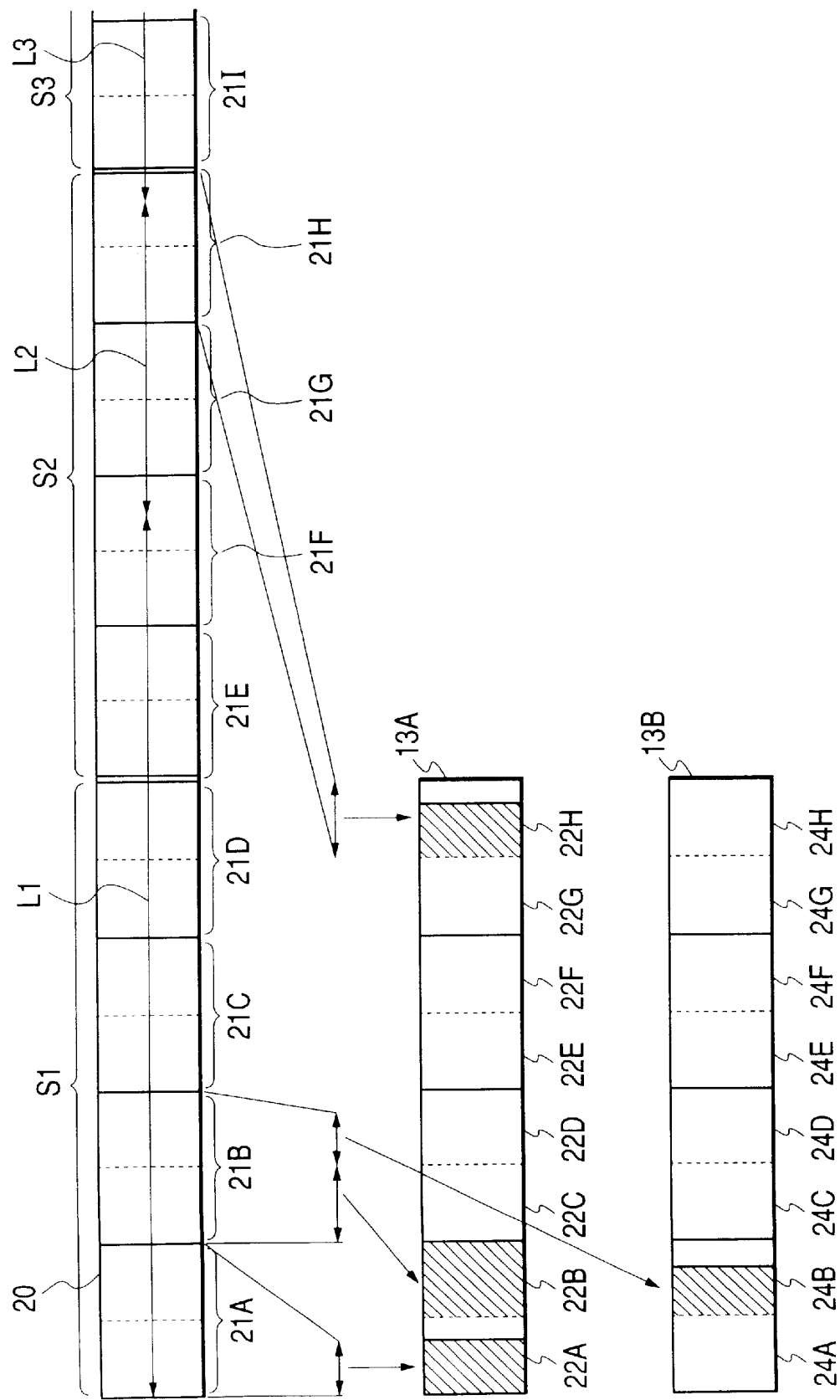
FIG. 1 shows the relationship between logical disk addresses for data stored according to an embodiment of the present invention and storage positions in a cache memory.

A disk storage system to which a method of storing compressed data, according to the present invention is applied, will hereinafter be described in further details by reference to several embodiments illustrated in the drawings. Incidentally, the same reference numerals indicate the same or similar elements in the following description. Only points different from the first embodiment will be principally described in the second and succeeding embodiments.

First Embodiment of the Invention

Figure 5:
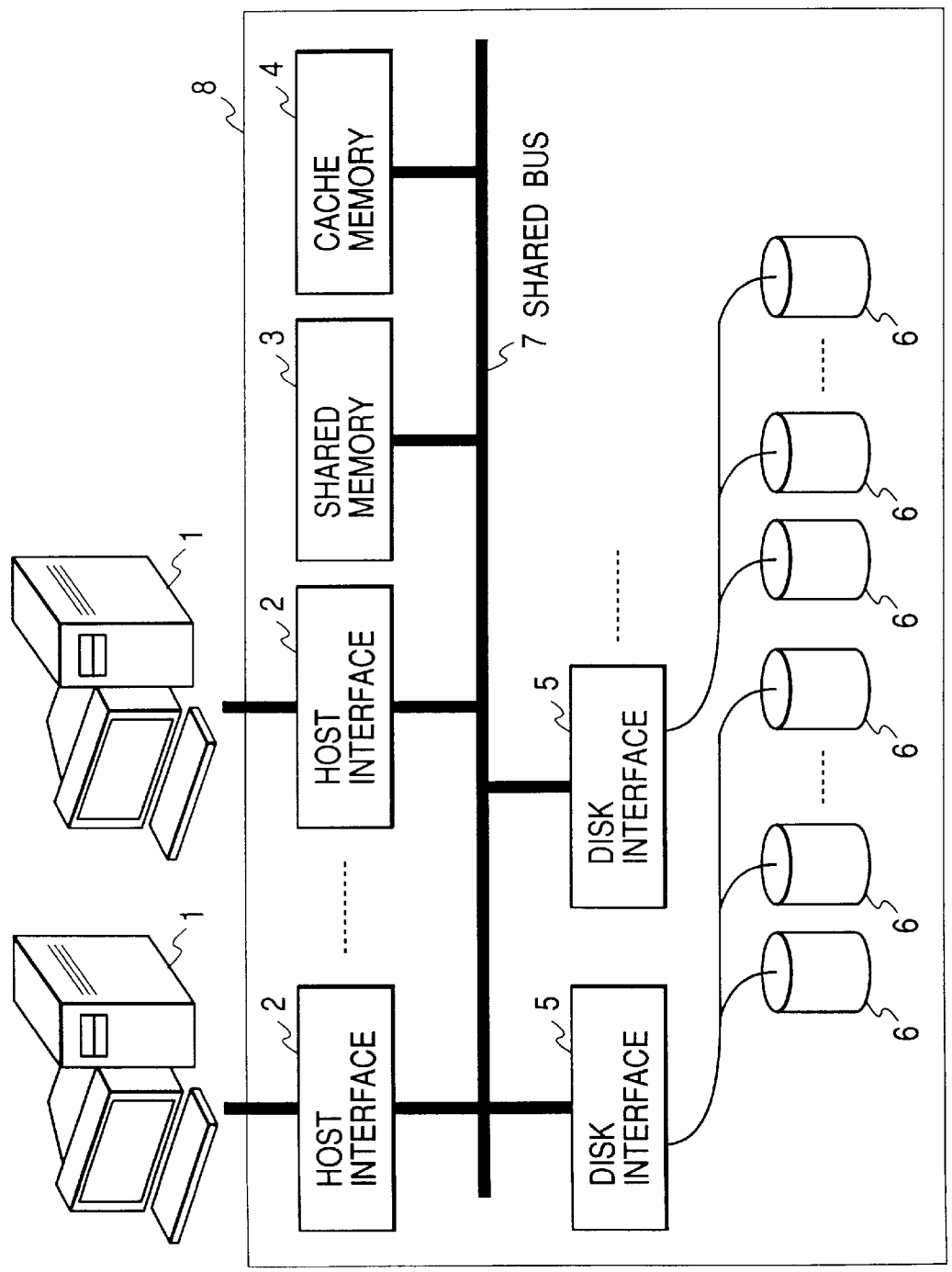
FIG. 5 schematically illustrates the structure of a disk array system showing the above-described embodiment of a method of storing compressed data according to the present invention.

Referring to FIG. 5, a disk array system 8 comprises plural host interfaces 2 respectively electrically connected to ones of plural hosts 1, a shared memory 3, a cache memory 4, plural disk interfaces 5 respectively electrically connected to plural disk drives 6, and a common bus 7 for providing electrical connections between these devices. The hosts 1 to be connected to the plural host interfaces 2 may be the same.

The shared memory 3 and the cache memory 4 are shared resources that the plural host interfaces 2 and the plural disk interfaces 5 can refer to. Namely, data supplied from the hosts 1 to the disk array system 8 and data read from the disk drives 6 and outputted to the hosts 1 are temporarily stored in the cache memory 4. The shared memory 3 and the cache memory 4 are physically configured on the same memory in practice but are illustrated in the drawing as distinguished from each other.

Input/output data is stored in the cache memory 4 and control information such as a cache directory or the like used to manage the data in the cache memory 4 is stored in the shared memory 3. The plural host interfaces 2 and the plural disk interfaces 5 actively access these shared resources to perform the transfer of data from or to the shared resources. Incidentally, the present invention can be applied to a disk storage system which has a CPU common to the entire disk storage system and controls the transfer of data between each of the plural host interfaces 2 and the plural disk interfaces 5 and the shared resources by the CPU.

Figure 6:
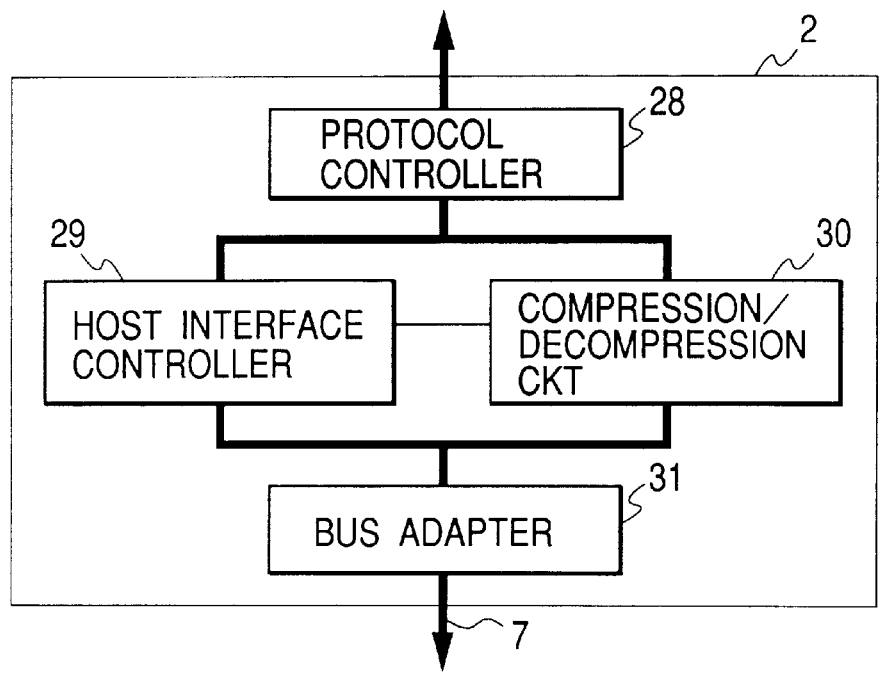
FIG. 6 schematically shows the structure of a host interface employed in the disk array system shown in FIG. 5.

Each of the disk interfaces 5 comprises an SCSI interface circuit for performing the transfer of data between each individual disk drive 6 and the cache memory 4. As shown in FIG. 6, each of the host interfaces 2 comprises a protocol controller 28, a host interface controller 29, a compression/decompression circuit 30 and a bus adapter 31.

The protocol controller 28 sends a disk input/output command and data to be written into the disk drive 6, which have been transmitted from a host 1 in accordance with a commonly-standardized protocol, to the host interface controller 29 and the compression/decompression circuit 30. Further, the protocol controller 28 receives a command and data to be contained in a response command, for transferring data subjected to a read request from the input/output command sent from the host 1, from the host interface controller 29 and compression/decompression circuit 30 and transmits them to the host 1 in accordance with the commonly-standardized protocol.

The bus adapter 31 performs the conversion of the protocol between the host interface controller 29, the compression/decompression circuit 30 and the common bus 7, and the actual transfer of data between a region in the cache memory 4, specified by the host interface controller 29 and the host interface 2.

The host interface controller 29 internally includes a CPU and a memory and performs the following control in accordance with a program stored in the memory. Namely, the host interface controller 29 analyzes a command of the input/output command sent from the host 1, and refers to the cache directory from the shared memory 3 through the bus adapter 31 in accordance with disk address information specified by the contents of the command to thereby make a cache hit/miss decision as to data required by the command. Further, the host interface controller 29 controls the startup and operation of the compression/decompression circuit 30 according to the contents of the command and controls the flow of data between the cache memory 4 and the host 1 and the flow of data between the cache memory 4 and the disk drive 6. Thus, in the present embodiment, the host interface controller 29, the compression/decompression circuit 30 and the shared memory 3 implements the reading of data from and writing data to the cache memory 4.

Described more specifically, upon executing a process for writing data from the host 1 to the disk array system 8, the host interface controller 29 refers to the cache directory stored in the shared memory 3 based on a disk address contained in the input/output command given from the host 1 to thereby make a hit/miss decision as to the cache memory 4. If a cache hit is found in the cache memory 4, then the host interface controller 29 updates the data on the cache memory 4 in accordance with new written data given from the compression/decompression circuit 30. If a cache miss is found therein, then the protocol controller 28 replaces the data already stored in the cache memory 4 with the new written data given from the compression/decompression circuit 30. The replaced data is written into the disk drive 6 by the disk interface circuit 5. In the present embodiment, the data obtained by compressing the data delivered from the host 1 is stored in the cache memory 4 and the data preceding its compression is stored in the disk drive 6.

Upon execution of a process for reading data from the disk array system to a host 1, the host interface controller 29 firstly makes a hit/miss decision as to the cache memory 4 in response to a disk address specified or designated by the input/output command given by the host 1. If a cache hit is found therein, then the host interface controller 29 reads data of the disk address from the cache memory 4. Thereafter, the compression/decompression circuit 30 decompresses the data and sends it to the host 1 through the protocol controller 28. If a cache miss is found therein, then the host interface controller 29 reads data of the disk address from the disk drive 6 and sends it to the host 1 through the protocol controller 28. Thereafter, the compression/decompression circuit 30 compresses the data, which in turn is stored in the cache memory 4.

The operation of the disk storage system according to the present embodiment will be described below in detail. Let's now assume the operating system (OS) for controlling each host 1 is an MVS developed by IBM corp. A command issued from the OS is handled as a command for a logical disk storage system assumed by the OS. A disk address specified by the command is one for the logical disk storage system. The disk array system 8 emulates the logical disk storage system assumed by the OS.

It is known that several RAID levels can be used to allow the emulation of the disk array system. In the present embodiment, however, a RAID 5 is used. Described more specifically, the disk array system 8 assigns one track lying within one disk drive 6 in association with respective tracks for the respective logical drives lying within the logical disk storage system. The capacity of the track lying within each disk drive 6 is normally defined so as to be equal to that of a logical track or greater than that. In the present embodiment, the two types of tracks referred to above are assumed to be equal in capacity to each other for simplification. Namely, one track premised by the OS corresponds to one track on one disk drive even in the case of the writing of data into an actual disk drive 6 by the disk array system 8. Thus, one logical track might not be distinguished from a physical track defined in association with it.

The command issued from the OS makes a request for the writing of one or plural records which belong to one logical track of one logical drive. The disk array system 8 effects the write command on a physical track assigned to a track having a disk address specified by the write command. Therefore, the disk array system 8 converts a logical address specified by either a write command or a read command issued by the OS into a corresponding physical disk address for a physical one track. However, the disk array system 8 uses the logical disk address specified by either the write command or the read command issued by the OS as it is when the cache memory 4 is accessed.

The operation of the disk array system 8 is logically divided into two parts. One thereof is the conversion of data between a host 1 and the cache memory 4 by the host interface controller 29. The other thereof is the conversion of data between the cache memory 4 and the disk drive 6 by the disk interface 5.

In the disk array system 8, all the data converted between the host 1 and the disk drive 6 bypasses the cache memory 4. The write data supplied from the host 1 is compressed by a method to be described later and stored in the cache memory 4. Upon the conversion of data between the cache memory 4 and the disk drive 6 by the disk interface 5, the data supplied from the host 1 and stored in the cache memory 4 is written into any track in any of the disk drives 6 in accordance with the RAID level adopted by the disk array system 8.

In the present embodiment, when a mode for compressing the data transferred from the host 1 and storing it in the cache memory 4 is specified by the host 1 in advance or when the mode is previously set in the disk array system 8, the host interface controller 29 controls the compression/decompression circuit 30 so that it compresses the write data transferred from the hose 1 to the disk array system 8 and the compressed data is stored in the cache memory 4. At this time, the write data is divided into plural data blocks and the respective data blocks are compressed. Positions where the write data is divided into the plural data blocks, are defined according to plural track blocks defined within the logical track assumed by the OS. One track block is capable of storing the amount of data equal to two cache block lengths. Thus, the magnitude of each individual data block is equal to the two cache block lengths or smaller than the same. When the compressed data is greater than one cache block length, a portion equivalent to a cache block length in the compressed data is stored in a first cache block, whereas a portion (overflow data) greater than the cache block length is stored in a second cache block discontinuous with the first cache block. At this time, the bus adapter 31 is constructed so as to be able to continuously transfer the portion equal to the cache block length and the overflow data in the compressed data to the first and second cache blocks.

Although the compression/decompression circuit 30 is provided within each host interface 2 in the present embodiment, the present circuit may be provided within other components or the like electrically connected to the cache memory 4 and the common bus 7. Although the compression/decompression circuit 30 is operated in accordance with the known compression/decompression algorithm, another algorithm may be applied thereto. Incidentally, since a process for compressing/decompressing the data is executed on a pipeline basis simultaneously with the process for transferring data between the host 1 and the compression/decompression circuit 30 or the process for transferring data between the compression/decompression circuit 30 and the cache memory 4, it has little effect on the time required for the host 1 to obtain access to the disk drive 6.

The OS supplies SEARCH and WRITE commands corresponding to plural records so that the records are successively written into the same track in order of record numbers. A first record is written into one track from the leading position of the track and a second record is written into a storage region subsequent to the storage region of the first record. The subsequent records are similar to the above. Plural variable-length records can be written into the respective tracks.

The SEARCH command requires the disk storage system to position a read head. This command specifies a disk address with respect to a record to be accessed. The address corresponds to a disk address called "CCHHR", in which CC represents 2-byte data indicative of a cylinder address, HH represents 2-byte data indicative of a head address, and R represents one-byte data indicative of a record number. Thereafter, the OS issues the WRITE command therefrom and supplies each record to be written to the disk array system 8. This command also specifies the address CCHHR and a record length. Each record to be supplied from the OS includes data to be written and control data located prior to that data. The control data includes a record length, a record number, etc.

When the OS reads the already-written record, the OS will issue a SEARCH command for specifying the read record and a READ command for specifying the record. The present READ command specifies the above-described disk address but does not designate the record length.

Data management information on the cache memory 4, which is called "cache directory", is stored in the shared memory 3. The host interface 2 and the disk interface 5 refer to the information about the cache directory to thereby make a decision as to whether data to be read or written does not exist on the cache memory 4 (cache miss) or exists on the cache memory 4 (cache hit). If the cache hit is found in the cache memory 4, then the position (hereinafter might be called "cache memory address") of a storage location in the data on the cache memory 4 can be obtained.

Figure 2:
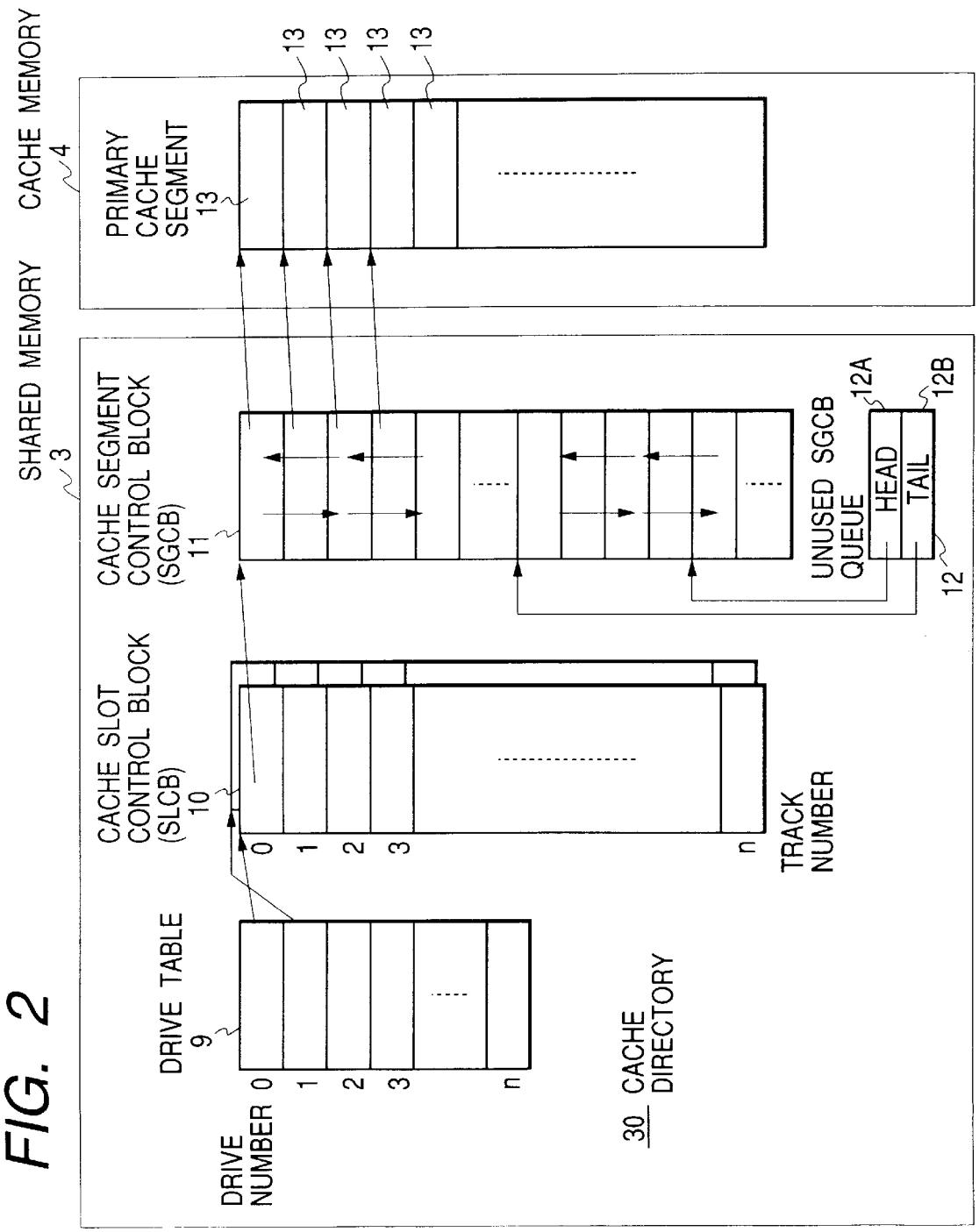
FIG. 2 illustrates one example of a cache directory employed in a disk storage system according to the present invention.

Referring to FIG. 2, the cache directory 30 comprises a drive table 9, cache slot control blocks (SLCB) 10 equal to the number of logical disk drives, and a cache segment control block (SGCB) 11. The drive table 9 represents logical disk drives included in the logical disk storage system assumed by the OS of the host 1. Namely, one entry of the drive table 9 corresponds to one logical disk drive. The respective entries of the drive table 9 hold pointers indicative of the heads of the cache slot control blocks 10 provided so as to be associated with the logical disk drives corresponding to the entries, respectively.

Each individual entry (hereinafter might be called "SLCB block") of the cache slot control block 10 corresponds to one logical track of the corresponding logical disk drive. Each individual SLCB entry has a pointer indicative of one entry (hereinafter might be called "SGCB entry") in the cache segment control block 11. The SGCB entry has information for managing one cache segment to be described later, lying within the cache memory 4. The drive table 9 and each cache slot control block 10 are produced upon system initialization and the pointers for the cache slot control blocks 10 respectively corresponding to the entries of the drive table 9 are also generated simultaneously.

A storage region in the cache memory 4 is logically divided into regions each having a predetermined length, e.g., a 16-Kbyte length, which is called a cache segment. Now assume that each logical track and each physical track respectively have a 64-Kbyte capacity in the present embodiment. Accordingly, all the data on the respective logical tracks can be held by four cache segments. It is thus desirable to normally make the capacity of each cache segment equal to one over an integer times as large as the capacity of each logical track. As shown in FIG. 1, each individual cache segment 13 is divided into plural regions called plural cache blocks 22 each having a predetermined magnitude. Assuming that, for example, the capacity of the cache block 22 is 2 Kbytes, each individual cache segment 13 is made up of eight cache blocks 22. In general, the total number of cache blocks in each cache segment may preferably be equal to an integral multiple of the ratio between the capacity of the cache segment and the length of data compressed at a time. Since the data is compressed in a unit of the capacities of the two cache blocks in the present embodiment, it is desirable that the total number of the cache blocks in one cache segment is an even number. The cache segment control block 11 manages the states of all the cache segments 13 lying within the cache memory 4. The number of the SGCB entries is equal to the total number of the cache segments 13 in the cache memory 4. When the cache memory 4 has a capacity of 16-Mbyte, for example, the total number of the cache segments 13 results in 1024 and hence the cache segment control block 11 having 1024 entries is used. Each individual cache segment can be associated with one of the SGCB entries. As will be explained later, plural SGCB entries corresponding to plural cache segments 13 for holding data belonging to the same logical track on the same logical disk drive are linked to each other by pointers. This is because, when the data is continuously written into the same logical track, the plural cache segments to write the data are accessed at high speed.

Upon system initialization, the number of the entries in the cache segment control block 11 is determined so that the cache segment control block has entries whose number corresponds to the capacity of the packed cache memory 4. Further, these entries are all linked to an unused SGCB queue 12 and constitute an unused queue. These entries are linked to one another by pointers. The unused SGCB queue 12 has a head pointer 12A and a tail pointer 12B respectively indicative of a head entry and a tail entry of these plural linked unused entries. In order to point one cache segment lying within the cache memory 4, its corresponding cache segment address is written into each SGCB entry. The linkage between each SGCB entry and one cache segment determined in this way remains unchanged subsequently. A null value (invalid value) is set to each individual entry of the cache slot control block 10. This represents that no valid data exists in any cache segment of the cache memory 4.

Figure 3:
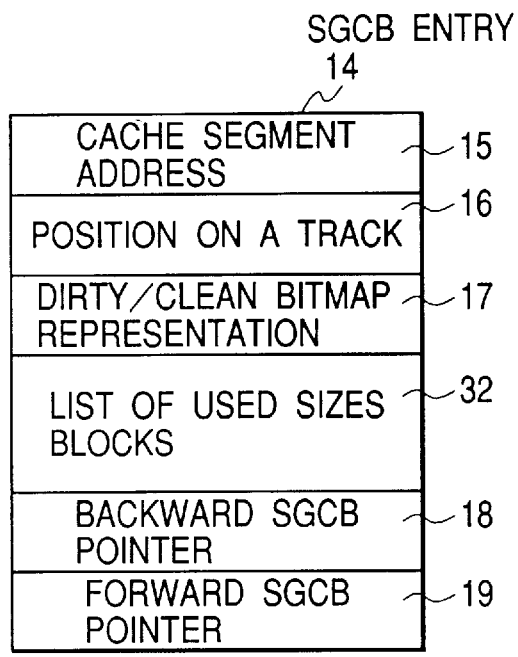
FIG. 3 depicts structure of each entry in a cache segment control block included in the cache directory shown in FIG. 2.

As shown in FIG. 3, one SGCB entry 14 has a head address 15 of its corresponding cache segment, a position 16 on a track of the cache segment, a dirty/clean bitmap representation 17 of data written into the cache segment, a backward SGCB pointer 18 and a forward SGCB pointer 19 for linking the SGCB entry to other SGCB entries provided in association with other cache segments for holding data belonging to the same logical tracks, and a list 32 of used sizes in blocks.

Referring to FIG. 1, reference numeral 20 indicates a memory region lying within one logical track in one logical disk drive. In the present embodiment, each address applied to data to be written into the cache memory corresponds to an address for the storage region in the logical track and is specified by a logical disk address designated by the OS. In the present embodiment, this address represents an address for a corresponding storage region lying within a physical track corresponding to the logical track. The logical track 20 is divided into plural regions S1, S2, S3, . . . of a predetermined capacity. These regions will be called track segments. Vertically-extending double lines in FIG. 1 indicate the boundaries of the track segments S1, S2, S3, . . . . In the present embodiment, the capacity of each track segment is selected so as to be equal to the capacity (16 Kbytes in the present embodiment) of the cache segment. In the present embodiment as already described above, one logical track and one physical track have been respectively assumed to have a capacity four times as large as that of each cache segment. Thus, the logical track 20 can be divided into four track segments S1, S2, S3, . . . . The plural track segments are marked with numbers from the head position of the track in order. The position-on-the-track 16 represents a number for each track segment to which data held in the cache segment corresponding to the SGCB entry 14 belongs. In the present embodiment, the data belonging to the two continuous track segments can be held in one cache segment. The position-on-the-track 16 is represented by the low number of the numbers for the two track segments capable of being held in the corresponding cache segment.

The respective track segments are respectively further divided into plural partial regions 21A, 21B, . . . , 21H each having a predetermined capacity. In the present embodiment, the capacity of each partial region is selected so as to reach twice that of the cache block. Thus, the individual track segments can be divided into four partial regions respectively in the present embodiment. These partial regions will be called track blocks or blocks. Alternatively, a group of data having in-track addresses belonging to each track block, e.g., 21A might be called a data block or a data block 21A, or might be simply called a block or the like. In FIG. 1, the vertically-plotted solid lines indicate the boundaries between the track blocks.

The vertically-plotted dotted lines indicate the boundaries between half regions of the track blocks. Each of the capacities of the half regions of these track blocks is equal to that of each of the cache blocks belonging thereto. In the present embodiment, one cache segment is capable of holding data obtained after the compression of data belonging to eight track blocks included in the two track segments. The dirty/clean bitmap representation 17 is a bitmap having 8 bits corresponding to eight cache blocks lying within the cache segment corresponding to the entry 14. The respective bits represent dirty/clean information about data held in the corresponding cache block, i.e., information about whether the data in the cache block has been updated by the host 1.

Figure 4:
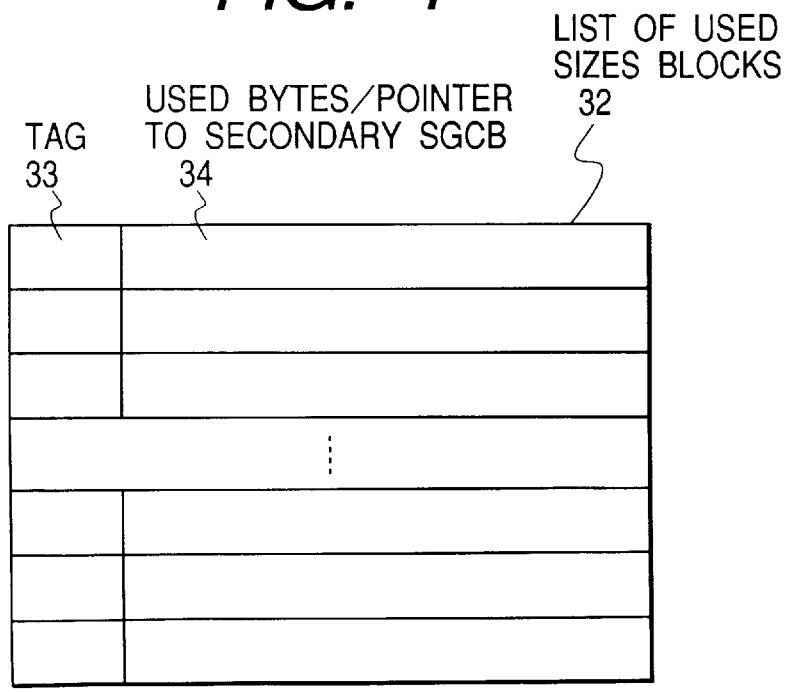
FIG. 4 shows one example of a list of used sizes in blocks, which is included in the entry shown in FIG. 3.

As shown in FIG. 4, each entry of the list 32 of used sizes in blocks corresponds to one cache block lying within one cache segment to which the SGCB entry 14 including the list 32 corresponds. Used bytes indicative of the length of effective data stored in the corresponding cache block or a pointer to another SGCB entry for managing a cache segment storing therein overflow data to be described later is stored in the field 34 in each entry. A distinction between the two is made according to the value of the tag 33.

FIG. 1 shows an example of storage regions for plural records L1, L2, L3, . . . stored in the logical track 20. The respective storage regions indicate storage regions for the records at the time when the records are stored in the logical track without being compressed. The record L1 extends from the head of the first track segment S1 to a midpoint in the second track segment S2. The record L2 is located at a midpoint in the track segment S2 and the record L3 extends from a midpoint in the track segment S2 to the track segment S3 subsequent to the track segment S2.

When the record L1 supplied from the host 1 is newly written into the cache memory 4, plural pairs of cache segments for holding the compressed record L1 are ensured. One of each cache segment pair is used to hold a portion less than a predetermined capacity, of the compressed record and will hereinafter be called a primary cache segment. On the other hand, the other of each cache segment pair is used to store data (overflow data) unable to be stored in the primary cache segment, of the compressed record and will hereinafter be called a secondary cache segment. In FIG. 1, reference numerals 13A and 13B respectively indicate the primary cache segment and the secondary cache segment as examples. The number of segment pairs to be ensured depends on the length of the record to be written and the position on the track at the time when the record is written into the track without being compressed. The record L1 indicates the head record and is located within the track segments S1 and S2. Thus, one pair of cache segments, e.g., 13A and 13B may be ensured for the record.

Ensuring each pair of cache segments is performed in the following manner. When unused two cache segments exist within the cache memory 4, the unused cache segments are used. Namely, unused two entries in the cache segment control block 11 are taken out based on an unused SGCB queue 12. Thereafter, two cache segments pointed by these entries are used for writing of the compressed record L1. When only one unused cache segment exists within the cache memory 4 or no unused cache segments exist therein, one or two cache segments already in use are ensured for writing of the record L1, by cache-segment replacement to be described later. Namely, an SGCB entry pointing one cache segment in use is used by replacement as an entry for managing the cache segment for writing the record L1.

According to the above-described method, the two SGCB entries for managing the two cache segments for writing the record L1 are ensured. In the following description, the SGCB entries respectively pointing the primary cache segment and the secondary cache segment will be called a primary SGCB entry and a secondary SGCB entry. An address for the ensured primary SGCB entry is written into an entry corresponding to a logical track intended to write the record L1 lying within a logical drive therein, of the cache slot control block 10 corresponding to the number of the logical drive intended to write the record L1 therein.

The following information is written into the primary SGCB entry and the secondary SGCB entry. An address for the corresponding primary cache segment 13A is stored at the head address 15 of the cache segment lying within the primary SGCB entry. Further, a lower number 1 of the numbers 1 and 2 for the track segments S1 and S2 to which the data to be stored in the primary cache segment 13 belongs, is stored in the position-on-the-track 16. Bits corresponding to all the track blocks to which the record L1 belongs, of all the bits in the bitmap representation 17, are all set to a value 1 indicative of "dirty". As will be described later, the record L1 is written from cache blocks 22A to 22F in the present embodiment. A value 1 indicative of the presence of the overflow data is written into the tags 33 of all the entries in the list-of-used-sizes-in blocks 32 as an initial value. The address for the secondary SGCB entry is stored in the field 34 in each entry as an initial value. The backward SGCB pointer 18 and the forward SGCB pointer 19 remain with invalid values held therein at present.

An address for the corresponding secondary cache segment 13B is stored at the head address 15 of the cache segment lying within the secondary SGCB entry. Further, the low number 1 of the numbers 1 and 2 for the track segments S1 and S2 to which the data to be stored in the secondary cache segment 13B belongs, is stored in the position-on-the-track 16. All the bits in the bit map representation 17 are all set to a value 0 indicative of "clean". A value 0 indicative of the absence of the overflow data is written into the tags 33 of all the entries in the list-of-used-sizes-in-blocks 32 as an initial value. Information indicative of used bytes=0 is written into the field 34. The backward SGCB pointer 18 and the forward SGCB pointer 19 remain with invalid values held therein. A process for ensuring the cache segment for writing the record L1 is finished in this way.

The compressed record L1 is written into the ensured pair of cache segments 13A and 13B in the following manner. The compression/decompression circuit 30 compresses the record L1 to be compressed with each track block as the boundary. Namely, the record, e.g., L1 is divided into the data blocks 21A to 21F that respectively belong to the same track blocks, and the respective data blocks are compressed. Each individual data block basically has 4 Kbytes. However, the final data block 21F is smaller than the 4 Kbytes but is compressed as it is. The capacity of each data block after compression depends on a compression algorithm and the contents of each data block to be compressed but can be generally compressed to a capacity not more than one-half the original data. Namely, if a compression ratio is defined by the ratio between the capacity of data before compression and the capacity of data after compression, then the compression ratio can be set to be not more than 50% in most cases. Thus, the data blocks after the compression of most of data blocks before compression become not more than 2 Kbytes and hence can be stored in one cache block. Such data blocks after compression are stored in their corresponding cache blocks associated with the data blocks before compression, of the primary cache segment.

Although the compression ratio can be generally set to 50% or less, it reaches 50% or more depending upon data blocks before compression in some rare cases. Therefore, there may be cases in which the compressed data blocks cannot be stored in one cache block. In this case, the head portion (hereinafter might be called a cache block length portion) of 2 Kbytes of the compressed data blocks is stored in a cache block corresponding to the data block before compression, of the primary cache segment. A portion (hereinafter might be called an overflow data portion) exceeding 2 Kbytes in the compressed data blocks is stored in a cache block corresponding to the data block before compression, of the secondary cache segment 13B.

In FIG. 1, the compressed data of the first data block 21A in the record L1 is assumed to be 2 Kbytes or less. This compressed data block is written into the leading cache block 22A of the primary cache segment 13A. At this time, the remaining region of the cache block 22A is not used for storing the subsequent compressed data. No data is written into the leading cache block 24A of the secondary cache segment 13B. Compressed data of the second data block 21B of the record L1 is supposed to be more than 2 Kbytes. A cache block length portion lying within the data block 21B after compression is written into the second cache block 22B of the primary cache segment 13A. An overflow data portion within the data block after compression is written into the second cache block 24B of the secondary segment 13B.

Thus, the storing of the overflow data portion into the cache block 24B corresponding to the cache block in which the cache block length portion is written, can eliminate the need to store into the cache segment control block 11, the number of the cache block with the overflow data portion written therein within the cache segment 13B. Thus, the memory capacity necessary for the cache segment control block 11 can be reduced and the storing and reading operations of the overflow data portion are simplified, whereby overhead of access to the cache memory 4 can be cut down. The subsequent data blocks 21C to 21F of the record L1 are successively compressed in the same manner as described above, which in turn are written into the cache blocks 22C to 22F of the primary cache segment 13A and into the cache blocks 24C to 24F of the secondary cache segment 13B as needed.

During the above-described write operation, the primary SGCB entry and the secondary SGCB entry corresponding to the primary cache segment 13A and the secondary cache segment 13B are updated in the following manner. When compressed data for a data block included in the record L1 does not exceed a cache block length, an entry corresponding to the data block, of the list-of-used-sizes-in-blocks 32 of the primary SGCB entry is updated. Namely, a value 0 indicative of the absence of overflow data is written into the tag 33 of the entry and the capacity of the compressed data block is written into the field 34. When, on the other hand, the compressed data for a data block included in the record L1 exceeds the cache block length, the head address of the secondary SGCB entry is written into an entry or a field 34 thereof corresponding to the data block, of the list-of-used-sizes-in-blocks 32 of the primary SGCB entry. The capacity of overflow data in the compressed data is written into the field 34 of the entry corresponding to the data block. A bit corresponding to the data block, of the bitmap representation 17 of the secondary SGCB entry is updated to a value 1 indicative of "dirty".

Thus, the writing of the record L1 into the cache memory 4 is completed. If the secondary cache memory 13B is not used as a result of the storage of the record L1 into the cache memory 4, then the secondary SGCB entry already ensured within the cache segment control block 11 is handled as an unused entry and the cache segment 13B is handled as an unused cache segment. When the record L1 includes the data belonging to the subsequent track segment S3 and the like, one pair or plural pairs of cache segments are ensured within the cache memory 4 in the same manner as described above. One pair or plural pairs of SGCB entries corresponding to them are ensured within the cache segment control block 11. Further, the operations already described for the data belonging to the track segment S3 or its succeeding track segments are repeated for these SGCB entries and these cache segments.

Thereafter, when a command for making a request for writing of the record L2 subsequent to the record L1 is issued from the host 1 to the disk array system 8, the record L2 is written into the cache memory 4 in the following manner. In the present embodiment, it is possible to easily determine that the record L2 is data belonging to the track blocks 21F to 21H of the track segment S2. This determining method is identical to the reading of the record L2 by a READ command to be described later. Thus, the compressed record L2 is written into the cache blocks 22F to 22H lying within the primary cache segment 13A with the record L1 written therein, in a manner similar to the record L1. The present example does not need to ensure a new cache segment pair for the record L2.

Incidentally, the data block of the record L1, which belongs to the track block 21F, has already been compressed and stored in the cache segment 22F. Thus, when the data stored in the cache block 22F is read before the compression of the data block and is thereafter decompressed by the compression/decompression circuit 30. A set of the decompressed data and the data of the record L2, which belongs to the track block 21F, is compressed by the compression/decompression circuit 30 and the compressed data is written into the cache block 22F. The leading partial data of the record L2 also includes control data used for the record L2 in the same manner as the record L1. Incidentally, when the secondary cache segment 13B has already been released as a result of the writing of the record L1, the secondary SGCB entry is ensured again within the cache segment control block 11 before the writing of the record L2 and hence the secondary cache segment is also ensured. When overflow data is generated as a result of the compression of the data in the record L2, the overflow data is written into the cache block placed within the secondary cache segment in the same manner as the record L1.

Further, when the subsequent record L3 is written into the cache memory 4, the leading data block belonging to the track segment S2, of data in the record L3 is compressed and written into the cache block 22H. This writing is performed in a manner similar to the writing of the leading data block of the record L2. Upon writing the subsequent data belonging to the track segment S3, of the data in the record L3, a new cache segment pair is ensured and the data is written therein in the same manner as described above.

When the cache segment pair is newly ensured, a pair of a primary SGCB entry and a secondary SGCB entry is newly ensured within the cache segment control block 11 in a manner similar to the record L1. When plural pairs of primary SGCB entries and secondary SGCB entries are ensured for data to be written into the same track, addresses for linking the primary SGCB entries are written into backward pointers 18 and forward pointers 19 in the respective pairs of primary SGCB entries. Thus, when the data to be written into the same track are written into plural primary cache segments, the plural primary SGCB entries corresponding to the primary cache segments are linked by pointers. Similarly, when the plural secondary SGCB entries corresponding to the primary SGCB entries exist within the cache segment control block 11, the secondary SGCB entries are also linked by pointers.

When the host 1 has issued a READ command for reading any of the records already written into the cache memory 4 and the cache memory 4 hits with respect to the READ command, the cache memory 4 is accessed in the following manner.

The head primary SGCB entry of the linked primary SGCB entries lying within the cache segment control block 11, which corresponds to a logical drive and a logical track to store a record to be read therein, is read out using the drive table 9 and the cache slot control blocks 10 placed within the cache directory 30. The cache segment address 15 placed within the leading primary SGCB entry specifies a primary cache segment which holds data belonging to the leading track segment S1, which is to belong to the logical track. Thus, when the record specified by the READ command is of the leading record L1, the leading cache block of the primary cache segment is read and decompressed by the compression/decompression circuit 30. The host interface controller 29 cuts out a record length in the control data of the record L1, which is included in the decompressed cache block.

In the present embodiment, the host interface controller 29 can easily determine a cache block to be read according to the record length. Namely, each individual cache block in the primary cache segment, e.g., 13A corresponds to one track block. Thus, plural cache blocks which hold plural data blocks belonging to plural track blocks having an address range in which an address on a track extends from 0 to a value equal to the record length, may be read from the primary cache segment 13A. In the case of the record L1, these track blocks range from 21A to 22F. It can be thus easily judged that the cache blocks 22A to 22F may be read. Therefore, only the above-described cache blocks of the cache blocks placed within the primary cache segment 13A are successively read out.

When data stored in any cache block, e.g., 22A in the primary cache segment 13A is smaller than 2 Kbytes at this time, the length of data to be read from the cache block can be determined according to used bytes 34 held in a list 32 placed within the primary SGCB entry corresponding to the cache segment. Whether or not overflow data exists in data stored in any cache block, e.g., 22B placed within the cache segment 13A, can be determined according to the tag 33 in the same list 32. If the overflow data exists therein, then a corresponding cache block 24B lying within a corresponding secondary cache segment 13B is read subsequently to the cache block 22B.

Thus, the data in the plural cache blocks read from the primary cache segment 13A and the secondary cache segment 13B are successively decompressed by the compression/decompression circuit 30 and the decompressed data are transferred to the host 1. When the cache block 24B holding therein the overflow data for the data in the cache block, e.g., 22B lying within the primary cache segment 13A exists in the secondary cache segment 13B upon this decompressing operation, the data in these two cache blocks are linked to each other and decompressed.

Incidentally, a data block obtained as a result of the decompression of the data in the final cache block 22F to be read includes data belonging to the records L1 and L2. The length of the data belonging to the record L1 is equal to the difference between the record length already read from the leading cache block 24B and the length of the data already read from the cache blocks 22A to 22F and decompressed. The latter length can be calculated by the product of the number of the cache blocks 22A to 22F and 4 Kbytes. As is apparent from the above description, it is unnecessary to read other cache blocks 22G and 22H placed within the same cache segment 13A. In the present embodiment, the necessary data can be read from the cache memory 4 and decompressed even when the head record is read. Thus, the reading of unnecessary data not required by the READ command can be reduced.

When it is desired to read the record L2, the control data in the record L1 is first read in the same manner as described above. Based on the control data, the tail address of the record L1 is determined according to the length of the record L1. Based on the tail address of the record L1, the head address of the record L2 is determined. It is understood in this case that this address belongs to the track block 21F. Thus, the leading data block in the record L2 is read from the cache block 22F and thereafter decompressed by the compression/decompression circuit 30.

A decision of a cache block to be read is now done as follows: By using the number of the track segment S1 to which the track block 21F belongs to which the data to be read belongs, a linked primary SGCB entry string for a logical track to which the record belongs is accessed, to thereby find out one primary SGCB entry having the segment number included within the position-on-the-track 16. A cache segment, e.g., 13A pointed by a cache segment address 15 in the primary SGCB entry holds data belonging to the track segment S1. Thus, since the track block 21F corresponds to the sixth in the track segment S1, the sixth cache block 22F lying within the cache segment 13A is judged to be the cache block to be accessed.

Of the leading decompressed data of the so-read record L2, the data belonging to the record L2 is cut out. The length of the record L2 of control data contained in the cut-out data is cut out and a tail address of the record L2 is determined based on the length thereof. It is judged that the record L2 belongs to the track blocks 21F to 21H from the so-determined head address and tail address of the record L2. Thus, cache blocks 22G and 22H are also read. When the overflow data corresponding to the cache block 22F is placed in the cache block 24F in the above description, the data in the cache block 24F is read and a set of the data of theses cache blocks is decompressed. The leading data block of the record L2 is cut out based on the decompressed data.

Thus, when the record L2 is read, the cache block 21A including the control data of the record L1 is read. It is thus possible to easily judge a cache block which stores the leading data block of the record L2 therein. It is unnecessary to read and decompress all of the preceding record L1. Further, the reading of the leading data block of the record L2 makes it possible to easily determine a cache block storing therein the data block located at the tail of the record L2.

When the host 1 has supplied data for renewing a record already written into the cache memory 4, the record already written into the cache memory 4 is updated in the following manner. In the present embodiment, it is presumed that, when the already written record is renewed, the length of the record does not change. When the record to be renewed is of a record L1, the primary cache segment 13A with the record L1 stored therein and cache blocks 22A to 22F placed therein are detected in accordance with the already-described method. Thus, new data of the record L1 is compressed in the same manner as when the record L1 is first written, followed by writing to these cache blocks.

If a secondary cache segment 13B exists in the original record L1 and overflow data is produced with respect to the new record L1 after compression, then the already-existing secondary cache segment 13B is used to store the overflow data therein. If the secondary cache segment 13B does not exist for the original record L1 and the overflow data is produced with respect to the new record L1 after compression, then a new secondary cache segment is ensured for the overflow data of the new record L1. On the contrary, if the secondary cache segment 13B exists in the original record L1 and the overflow data is not produced with respect to the new record L1 after compression, then the already-existing secondary cache segment 13B is brought to an non-use state.

If it is necessary to store new data into the cache memory 4 when no unused cache segments exist in the cache memory 4, then the host interface controller 29 executes the replacement of cache data in accordance with a cache control program held therein. The replacement of the data in the cache memory 4 is performed in a unit of a track. Namely, one selected to be replaced by a replacement algorithm is a logical track. In practice, plural cache segments holding data of the track therein are replaced. Similarly, when a desired record in a track is read, all the contents of the track are placed on the cache. The selection of a logical track to be replaced is performed in accordance with a predetermined cache replacement algorithm. An LRU replacement algorithm for selecting an entry existing from the oldest time is an example of the algorithm. In order to select a logical track in accordance with this replacement algorithm, there is a need to store into the cache directory 30, for each logical track, a time interval or like that has elapsed since the recent use of the logical track. This information is not shown in FIG. 3 for simplification.

All the primary SGCB entries and secondary entries belonging to the selected logical track are selected. The selected SGCB entries are linked to the unused SGCB queue 12 to render them unused. The plural unused SGCB entries are ensured in this way. The plural unused SGCB entries ensured in this way and their corresponding plural cache segments are used to store data included in a new logical track. The method of storing the data is the same as one already described in regard to writing of the record L1.

When a dirty/clean bitmap representation 17 in a primary SGCB entry indicates that the contents of a cache block in the primary cache segment corresponding to a primary SGCB entry ensured as described above have bee changed, data in all the cache blocks placed within the primary cache segment is decompressed by the compression/decompression circuit 30 and written back into a suitable disk drive 6. Incidentally, a physical disk address to write back data in each of the primary cache segment and the secondary cache segment both of which belong to the selected logical track, is determined according to the number of the logical track.

Since the data is stored in the disk drive 6 without its compression in the present embodiment, the data on each disk drive 6 can be accessed in accordance with the conventional method as it is. Namely, when the data is read from and written into the disk drive 6, a process is unnecessary for identifying, for example, the number of a segment in a logical track to which the data belongs or the number of a data block to which the data belongs, which are required to read data from and write it into the cache memory in the present embodiment. In case the compression/decompression circuit 30 cannot be used due to its malfunction, the data on each disk drive 6 can be used as it is. Even if the cache memory 4 could not be used due to its malfunction, a method of directly accessing the data on each disk drive can be adopted. At this time, the compression/decompression circuit 30 is not used. Incidentally, the capacity of the cache memory 4 is limited, whereas the capacity of each disk drive is larger than that thereof. Thus, even if the data is stored in the disk drive without being compressed, its capacity does not become a big problem.

Hit/mishit of the cache memory in the present embodiment is executed in the following manner. The cache memory 4 mishits when the host 1 makes a request for first writing of a given record to a track and when the host 1 makes a request for obtaining an access to data in the already-written record for readout or writing, and data on a track including the data does not exist in the cache memory 4. In either case, an SGCB entry corresponding to the track on which the record required by the host has been stored is read. If the SGCB entry points a valid cache segment, then data of the intended record is held in the cache memory 4. Thus, it is judged that the cache memory 4 has hit. However, if the SGCB entry does not point a valid cache segment, then it is judged that the cache memory 4 has mishit. In this case, the intended record is read from a disk drive 6 and stored in the cache memory 4. Upon its storage, the aforementioned replacement operation is started up if necessary.

Incidentally, there is a possibility that a free region may be produced within the cache segments 13A and 13B, when the intermediate record L2 has been deleted after the records L1, L2 and L3 have been written into the cache memory 4 in the above-described manner. However, the OS employed in the present embodiment is to delete even the record L3 and the like subsequent to the record L2 upon deletion of the record L2. Thus, such free regions will not be produced in the cache segments. Namely, the cache blocks in the cache segment 13A, which have been used for the deleted records L2 and L3, are used to newly store a record L2 therein later. Further, the new cache segment previously ensured for the record L3 is available for a new record L2 or L3, or a record that belongs to other track.

In the present embodiment, the structure, capacity and management system of the secondary cache segment for storing the overflow portion make use of those for the primary cache segment for storing fixed-length data therein. Therefore, the present embodiment can be used without depending on the overflow rate, i.e., compression ratio of each cache block. Even if overflow occurs with all the cache blocks in one segment, the efficiency of utilization of the cache memory becomes simply the same as when non-compressed data is stored therein. Thus, the efficiency of utilization of the cache memory is not reduced. Namely, it can be said that the present embodiment would provide a system for increasing the capacity of the effective cache memory in a range of twice or less. When no overflow occurs, the amount of data which can be stored in the cache memory by the compression operation results in twice the amount of data when the data is not compressed. When the overflow occurs, the cost of retrieving the secondary cache segment with overflow data stored therein simply rises. This cost is low and such a case is very rare.

Second Embodiment of the Invention

Figure 8:
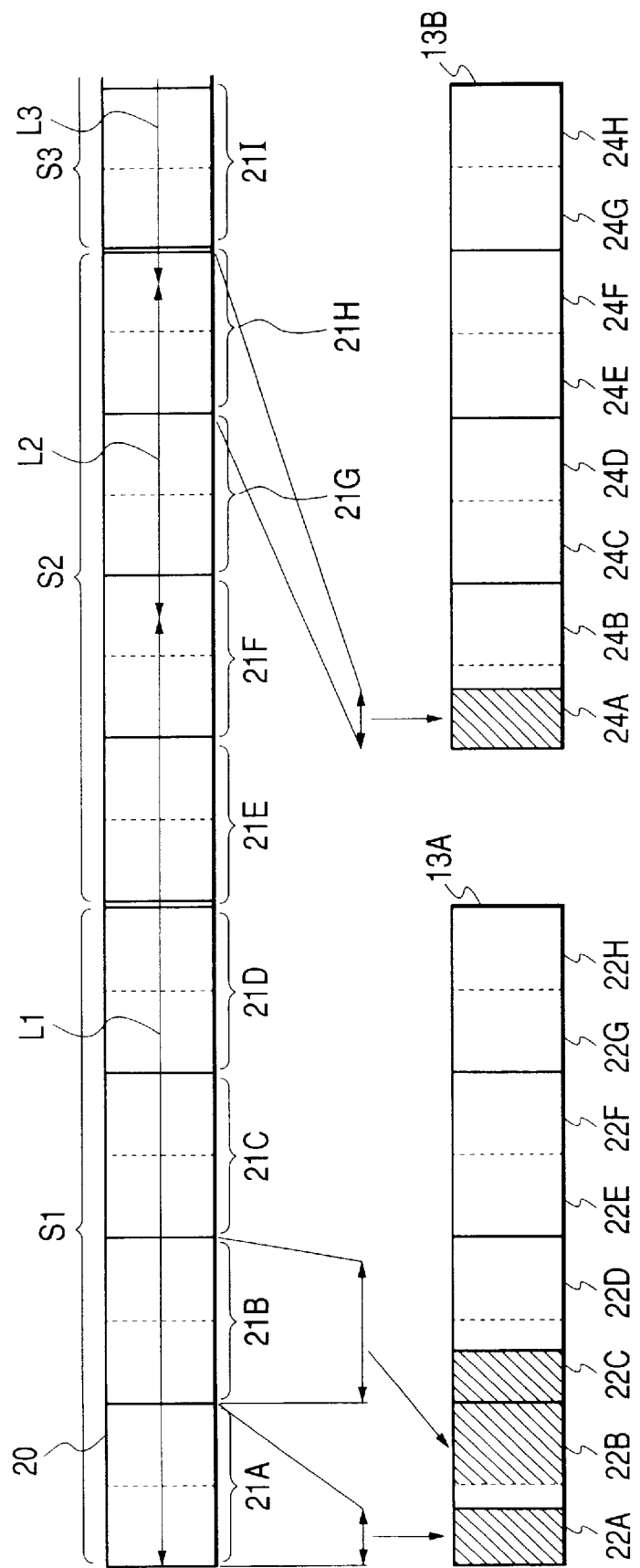
FIG. 8 illustrates the relationship between logical disk addresses for data stored according to another embodiment of the present invention and storage positions in a cache memory.

Compressed data can be stored even by a method shown in FIG. 8. In the present embodiment, when data obtained by compressing data blocks exceed 2 Kbytes, the compressed data are successively stored in the cache blocks in the cache segment 13A. Since compressed data in a data block 21A does not exceed 2 Kbytes when a record L1 is stored in a cache memory, for example, it is stored in the cache block 22A. Since, however, compressed data in a data block 21B exceeds 2 Kbytes, a cache segment length and overflow data of the data lock 21B subjected to the compression are stored in cache blocks 22B and 22C respectively. Assuming that any of compressed data in data blocks 21C to 21F that belong to the record L1, is not more than 2 Kbytes, the compressed data with respect to these data blocks 21C to 21F are successively stored in cache blocks 22D to 22G respectively.

Assuming that compressed data in the data blocks 21F, 21G and 21H is not more than 2 Kbytes when the next record L2 is stored, these data are stored in cache blocks 22G, 22H and 24H. The data block 21H is stored in the leading cache block 24A of the cache segment 13B. In this case, a pointer indicative of the head of entries of a cache segment control block 11, for managing the newly-secured cache segment 13B is stored in the final entry of a list-of-used-sizes-in-blocks 32, of a SGCB entry corresponding to the cache block 13A so that the cache segment 13B can be immediately retrieved.

The present embodiment is identical to the first embodiment in that control data in the record L1 is read to locate the start of the record L2, the head address of the record L2 is determined according to record length included in the control data and thereafter the cache block in which the data block having the address is written, is detected. However, the present embodiment needs to successively determine every cache block in the cache segment 13A as to whether overflow data exists in the compressed data of the record L1. This determination is performed in accordance with the list-of-used-sizes-in-blocks 32, in the primary SGCB entry corresponding to the cache block. Thus, although an additional process for checking the list 32 is required in the present embodiment as compared with the first embodiment, the present embodiment is identical to the first embodiment in that it is unnecessary to decompress all the compressed data of a record L. On the contrary, since the overflow data is stored following the cache block length in the present embodiment, the present embodiment has an advantage that the space available on the cache block is less. However, the present embodiment has a drawback as distinct from the first embodiment in that when any record, e.g., L2 is updated and the capacity of the record L2 subjected to compression is changed, a new record L2 after compression cannot be stored in the storage region of the original compressed record L2. Thus, the present embodiment is suitable for a disk storage system for storing therein fixed data free of such updating.

Modifications

The present invention is not necessarily limited to the aforementioned embodiments and can be implemented by various modifications including plural modifications shown below.

(1) The present invention is not limited to the disk array system. The present invention can be applied to an arbitrary disk storage system including a disk storage system having one disk drive. Further, the present invention is applicable even to a disk storage system which the present system has the same structure as that of the logical disk storage system assumed by the host and executes a command issued by a host as it is without emulating a logical disk storage system. In this case, a disk address specified by the command issued from the host is equal to a physical disk address. Even in such a case, the disk address specified by the command issued from the host is considered to be a logical disk address according to the present invention.

(2) The present invention can be applied to the case in which data is compressed and stored in a disk drive. In this case, it is desirable from the viewpoint of simplicity of processing that compressed data stored in a cache memory is stored in the disk drive as it is. However, the compressed data stored in the cache memory may be decompressed once and compressed by another compression algorithm suitable for the disk drive, after which it is stored in the disk drive.

(3) The ratio between the capacity of a track segment and the capacity of a cache segment or the ratio between the capacity of a track block and the capacity of a cache block may be different from each of those employed in the first embodiment. Further, other sized blocks may be used as an alternative to the data blocks used as the compression units, which have been employed in the first embodiment. In particular, the length of the data block used as the compression unit may be set to a size different from twice the capacity of the cache block.

(4) In the first embodiment, the capacity of the cache segment and that of the cache block are set to 16 Kbytes and 2 Kbytes respectively. However, the most suitable values of these capacities, the capacity of the cache block, and the number of cache blocks in the cache segment, and the like vary depending upon the capacity of the cache memory, the transfer rate of an internal bus, the capacity at the time when the host obtains access to the disk storage system, etc. The present invention is applicable without depending on the capacities of the cache segments and cache blocks and the number of the cache blocks in the cache segment.

(5) If the position where the overflow data is stored in the secondary cache segment 13B, is also represented in the field 34 of the list of used sizes in blocks shown in FIG. 4 together with the pointer to the secondary SGCB entry corresponding to the secondary cache segment 13B, then the space available in a memory and its operation result in complexity but the overflow data can be stored at an arbitrary position of the secondary cache segment 13B. In this case, each of fields 34 of used capacities in blocks corresponding to each overflow cache block, of a list of used sized in blocks, which is included in a primary SGCB entry for managing the primary cache segment 13A, becomes a pointer indicative of the head of the secondary SGCB entry.

Figure 7:
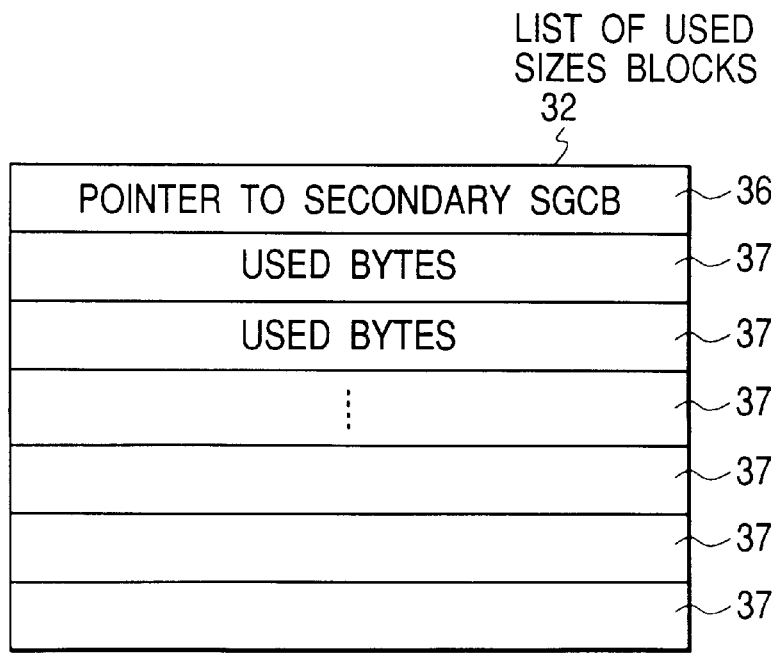
FIG. 7 depicts another example of the structure of the list of used sizes in blocks.

(6) The list-of-used-sizes-in-blocks 32 shown in FIG. 4 can be realized even by the structure shown in FIG. 7. Namely, the list 32 comprises a pointer 36 to the secondary SGCB entry for managing the secondary cache segment when the secondary cache segment storing the overflow data therein exists, and eight fields 37 indicative of used bytes in eight cache blocks lying within the corresponding cache segment.

(7) In the first embodiment, the pair of the primary cache segment and the secondary cache segment is ensured when the cache segments are newly ensured to write the records into the cache memory. Thereafter, if the secondary cache segment is found to be unnecessary, then the secondary cache segment is set to a non-use state. However, the following method can be adopted as an alternative to such a method. Namely, when the cache segment is newly ensured to write a record into the cache memory, only the primary cache segment is first ensured. When the overflow data is produced in the process of writing the compressed data of the record, the secondary cache segment is ensured.

(8) The first embodiment may be modified so as to specify compression/decompression for each logical drive or for each logical track. Namely, compression valid/invalid control information is stored in the drive table 9 and the SGCB entry. When data is transferred from the host 1 to the cache memory 4 based on the control information or when the data is read from the cache memory 4 and transferred to the host 1, a process for performing switching as to whether or not the compression/decompression should be done, is carried out based on the control information. At this time, a cache memory managing system and a cache hit/miss determining portion have nothing to do with whether or not the compression/decompression should be done, and are executed in the same procedure.

This modification is effective, for example, in the case in which the data stored in the disk array system 8 comprises a mixture of data such as an image or the like compressed by the host 1 and normally-compressible data. Namely, the data such as the image or the like compressed by the host is stored in a logical drive for which non-compression is designated, as it is and the normal data is compressed and stored in a logical drive for which compression is designated.

Incidentally, it is easy to change the first embodiment so that the data is written into a logical drive for which non-compression is designated or a logical track for which compression is designated. Namely, it is basically unnecessary to execute the compression/decompression process included in the process executed by the first embodiment and the process executed with the compression/decompression process. The field 33 of the list-of-used-sizes-in-blocks 32 is not used for data therefor.

(9) A technique called a permanent cache for allowing specific contents in a disk drive specified by a user to be kept resident on a cache memory is known. Since the contents specified by the user are rendered resident on the cache memory, the apparent capacity of the cache memory appears to be reduced. According to the present invention in contrast to this, the compression of the data resident on the cache memory allows limitation of decrease in the apparent capacity of the cache memory to about half. Further, even if the operation of non-compression on data non-resident on the cache memory, i.e., the operation of compression on part of the cache memory and non-compression on other thereof is performed, the present invention can limit increase in cache memory management cost to a very low level and is able to sufficiently have an improvement in response time with increase in effective cache memory.

(10) Various changes can be made to the system configuration employed in the first embodiment. For example, various modifications can be made to the structure of the circuit portion for implementing the control circuit for controlling the reading of data from and writing the same into the cache memory 4. For example, the structure of the cache directory 30 may be set to another one. The hit check on the cache memory may be executed by a dedicated memory storing a cache directory therein and a circuit for accessing the dedicated memory to check for hit.

According to the present invention, as has been apparent from the above description, it is possible to easily locate or access an arbitrary one of plural compressed data stored in a memory.

Particularly if the present invention is applied to the case in which plural variable-length records stored in a disk drive are compressed and stored in a cache memory, then an arbitrary one of the plural records belonging to the same track can be easily read from the cache memory.

What is claimed is:

1. A disk storage system, comprising:

at least one disk drive;

a cache memory for said disk storage device; and a control circuit;

wherein said control circuit divides write data to be stored in said disk drive as supplied from an upper level equipment, into a plurality of data blocks, based upon a logical disk address specified by said upper level equipment, and compresses said plurality of data blocks;

wherein said control circuit stores said plurality of data blocks after compression into a group of cache blocks within said cache memory, in such a manner that each cache block stores data belonging to one data block and does not store data belonging to different data blocks;

wherein said control circuit further determines, when one of said plurality of divided data blocks is to be read from said cache memory, at least one cache block within said group of cache blocks, which stores one compressed data block corresponding to said one data block to be read;

wherein said control circuit reads data stored in said at least one cache block;

wherein said control circuit decompresses said read data;

wherein a logical track specified by said logical disk address as specified by said upper level equipment is divided into a plurality of track blocks having same capacities as each other;

wherein said plurality of data blocks are defined such that each of said plurality of data blocks comprises only data having a logical disk address belonging to a same one of said plurality of track blocks;

wherein each of said group of cache blocks has a first capacity; and wherein said capacity of each of said plurality of track blocks is predetermined so as to have a second capacity larger than said first capacity.

2. A disk storage system according to claim 1, wherein when said control circuit is to store said plurality of data blocks after compression into said group of cache blocks, said control circuit stores one of said plurality of data blocks after compression into one cache block with said first capacity within said cache memory, if a capacity of said one data block after compression is not larger than said first capacity;

wherein said control circuit divides said one data block after compression into a plurality of division data blocks by said first capacity, if said capacity of said one data block after compression is larger than said first capacity, and stores said plurality of division data blocks into a plurality of cache blocks of said first capacity within said cache memory, respectively.

3. A disk storage system according to claim 1, wherein said second capacity is two times said first capacity.

4. A disk storage system according to claim 1, wherein said logical track is divided into a plurality of track segments which have a mutually same size and contains a mutually same plurality of track blocks;

wherein said cache memory comprises a plurality of cache segments;

wherein each cache segment comprises a plurality of cache blocks which have successive memory addresses and are same in number as said plurality of track blocks included in one track segment;

wherein, when said control circuit is to store said plurality of data block after compression into said group of cache blocks, said control circuit selects a first cache segment corresponding to a track segment to which a logical disk address of at least one of said plurality of data blocks before compression which compose said write data belongs;

wherein said control circuit stores one data block after compression corresponding to said at least one data block before compression into a first cache segment corresponding to a track block to which said at least one data block before compression belongs, if said cache block after compression is not larger than said first capacity;

wherein said control circuit divides said data block after compression corresponding to said at least one data block before compression into a plurality of division data blocks, if said data block after compression is larger than said first capacity, and stores a starting one of said plurality of division data blocks into said first said cache block;

wherein said control circuit further selects a second cache segment;

wherein said control circuit stores at least one other division data within said plurality of division data blocks into a second cache block within said second cache segment, corresponding to said track block to which said data block before compression belongs;

wherein, when one of said plurality of data blocks is to be read, said control circuit reads data in said first and second cache blocks, based upon a track segment and a track block within said track segment, to which a logical disk address of said one of said plurality of data blocks belongs.

5. A disk storage system according to claim 1, wherein when said control circuit is to write a succeeding record to a record included in said write data, after said write data has been written into said cache memory, and a head data block located at a head of said succeeding block belongs to a track block to which a tail data block located at a tail of said write data belongs, said control circuit reads said tail data block after compression, from at least one of said groups of cache blocks, based upon a logical track address of said track block;

wherein said control circuit decompresses said data block as read;

wherein said control circuit compresses combination data of said tail data block after decompression and said head data block, and stores said combination data after compression into said one cache block.

6. A disk storage system according to claim 1, wherein when said plurality of data blocks after compression are stored into said group of cache blocks within said cache memory, said control circuit stores search information for searching each of said group of cache blocks, based on a logical disk address of at least part of data which belongs to a data block stored therein, as part of search information for said cache memory;

wherein said determining of said at least one cache block which stores said one data block after compression corresponding to said one data block to be read is executed based upon said stored search information and said logical disk address of said at least one data block to be read.

7. A disk storage system according to claim 6, wherein the second capacity is two times said first capacity.

8. A disk storage system according to claim 6, wherein when said control circuit is to store said plurality of data block after compression into said group of cache blocks, said control circuit stores one of said plurality of data block after compression into a cache block of said first capacity, if said cache block after compression is not larger than said first capacity;

wherein said control circuit divides said one data block after compression into a plurality of division data blocks, if said one data block after compression is larger than said first capacity, and stores a starting one of said plurality of division data blocks into a plurality of cache block of said first capacity;

wherein said control circuit stores, as said search information, information for searching for said plurality of cache blocks where said plurality of division data blocks corresponding to said one data block after compression whose capacity is larger than said first capacity is stored;

wherein said at least one cache block which stores said one data block after compression corresponding to said one data block to be read is to be judged, said control circuit judges a plurality of cache blocks where a plurality of division data blocks corresponding to said one data block after compression are stored, based on said search information, when said one data block after compression is larger than said first capacity.

9. A disk storage system according to claim 6, wherein said logical track is divided into a plurality of track segments which have a mutually same size and contains a mutually same plurality of track blocks;

wherein said cache memory comprises a plurality of cache segments;

wherein each cache segment comprises a plurality of cache blocks which have successive memory addresses and are same in number as said plurality of track blocks included in one track segment;

wherein, when said control circuit is to store said plurality of data block after compression into said group of cache blocks, said control circuit selects a first cache segment corresponding to a track segment to which a logical disk address of at least one of said plurality of data blocks before compression which compose said write data belongs;

wherein said control circuit stores one data block after compression corresponding to said at least one data block before compression into a first cache segment corresponding to a track block to which said at least one data block before compression belongs, if said cache block after compression is not larger than said first capacity;

wherein said control circuit divides said data block after compression corresponding to said at least one data block before compression into a plurality of division data blocks, if said data block after compression is larger than said first capacity, and stores a starting one of said plurality of division data blocks into said first said cache block;

wherein said control circuit further selects a second cache segment;

wherein said control circuit stores at least one other division data within said plurality of division data blocks into a second cache block within said second cache segment, corresponding to said track block to which said data block before compression belongs;

wherein, when one of said plurality of data blocks is to be read, said control circuit reads data in said first and second cache blocks, based upon a track segment and a track block within said track segment, to which a logical disk address of said one of said plurality of data blocks belongs.

10. A disk storage system according to claim 9, wherein said control circuit stores information for relating said track segment corresponding to said first cache segment to said first cache segment as part of said search information for said cache memory.

11. A disk storage system according to claim 10, wherein said relating information comprises a number of said track segment corresponding to said first cache segment, as stored in correspondence to said first cache segment.

12. A disk storage system according to claim 9, wherein said control circuit stores information for relating said second cache segment to said first cache segment, in correspondence to said first cache segment, as part of said search information for said cache memory.

13. A disk storage system according to claim 6, wherein when said control circuit is to write a succeeding record to a record included in said write data, after said write data has been written into said cache memory, and a head data block located at a head of said succeeding block belongs to a track block to which a tail data block located at a tail of said write data belongs, said control circuit reads said tail data block after compression, from at least one of said groups of cache blocks, based upon a logical track address of said track block;

wherein said control circuit decompresses said tail data block as read;

wherein said control circuit compresses combination data of said tail data block after decompression and said head data block, and stores said combination data after compression into said one cache block.

* * * * *